Feb. 12, 1957  R. CALLAHAN  2,780,885
FISH BAIT HOLDERS
Filed April 28, 1954

INVENTOR.
ROBERT CALLAHAN
BY
ATTORNEY

2,780,885

FISH BAIT HOLDERS

Robert Callahan, Thomaston, Ga.

Application April 28, 1954, Serial No. 426,105

3 Claims. (Cl. 43—44.6)

This invention relates to a fish bait holder and particularly to a device having a place for a fish hook and being arranged for attachment to a fishing line to readily hold bait at the hook.

Certain types of fish prefer live bait, such as worms, crickets, lizards, and minnows, and will not strike at any other bait including live bait which has been injured. For this reason many fishermen prefer live bait fishing as they consider it more of a challenge and in using bait in this manner the conventional method of piercing the bait with the hook is employed to bait the hook. The largest problem is sticking the bait without unduly damaging it; an almost impossible feat since any living bug or the like when stuck begins immediately to bleed or loose body fluid and within a short period of time will die. The present invention fulfills a need for a fishing attachment which has a means thereon for holding the bait with a fish hook and in such a manner as not to injure or unduly restrict the bait.

An object of the present invention is to provide a fishing device which holds the live bait on a hook without any initial injury thereto.

Another object resides in holding fish bait in such a manner as to permit the bait some degree of limited movement.

Other objects are found in such things as the simplicity of construction and the ease of operation as well as dependable performance under normal fishing conditions.

Briefly described, the present invention according to a preferred embodiment (which may be modified within the scope of coverage as hereinafter presented) comprises a pair of opposed hinged members, spring means forcing corresponding ends of said hinged members into abutment forming a clamp adapted to receive and hold live bait therebetween, means for opening the clamp, and a fish hook fixed to one of said hinged members extending outwardly therefrom with the hook thereof adjacent a portion of any bait confined in said clamp.

A more complete outline of my invention will suggest and point out other and further objects and advantages and therefore reference is made to the following description taken in conjunction with the accompanying drawings, in which.

Figure 1:
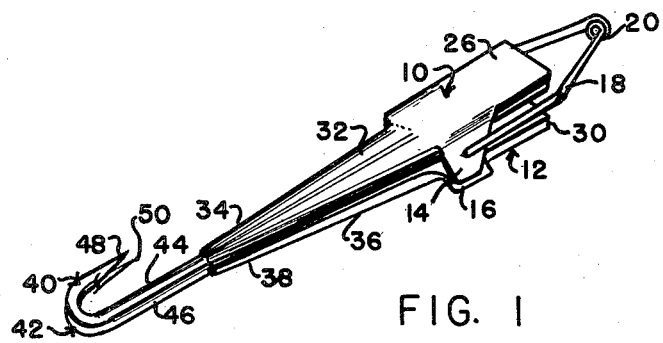
Fig. 1 is a perspective view of a preferred embodiment of my invention.

Referring to the several figures of the drawings, a pair of elongated clamp members 10, 12 each having side tabs 14, 16, respectively, are pivoted and hinged together at respective over-lapping side tabs 14, 16 by means of a pivot connector member 18 which extends through the tabs 14, 16 to form a closed link with an eyelet 20. A coil spring 22 is coiled around the straight portion of connector 20 between tabs 14, 16 and has one end 24 thereof bearing against the inside of member 10 at its terminal end portion 26 and the other end 28 is positioned against the inside of member 12 at its terminal end portion 30 thereby forcing the ends 26, 30 apart about the hinge line along link member 18.

The opposite end of member 10 from end 26 extends to form a tapered plate 32 beginning at the vicinity of hinge line 18 and tapering into an end sleeve-like terminal end portion at 34. The corresponding plate 36 of member 12 terminates in sleeve-like portion 38. The undersides of opposed plates 32 and 36 normally abut each other under pressure from the reaction of spring 22 about the hinge line 18. Pinching the opposed ends 26, 30 together in the manner shown in Fig. 2 pivots the members 10, 12 about hinge line of connector 18 bringing the sleeve-like portions 34, 38 apart. Obviously, anything positioned between normal position of sleeve-like portions 34, 38 or rigid extensions thereof, will be pinched therebetween with the amount of pressure depending upon the characteristics of spring 22.

Each of the sleeve portions has a fish hook 40, 42 as an extension thereof with a respective fish hook shaft 44, 46 inserted into the inside of the sleeve portion 34, 38. Sleeve portions 34, 38 are slightly resilient and of less inside diameter than the shafts 44, 46 so that press fitting is required thereby securely fixing the hooks in place. In addition, solder or the like may be employed around the hook shafts 44, 46 and respective sleeve 34, 38 to assure strong fastening and rigid connection therebetween. Each of the hooks 40, 42 terminates in a respective bottom hook portion and barb 48, 50 and if desired each of the hooks 40, 42 may be flattened on the underside 52, 54 thereof to give a better engagement.

Figure 2:
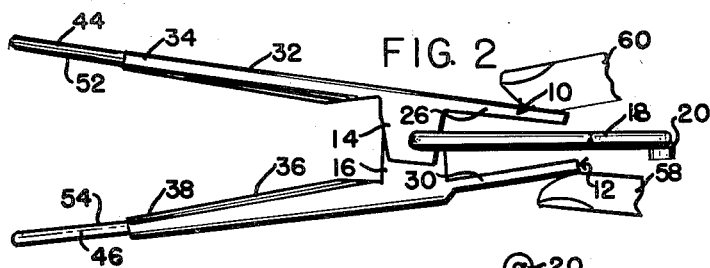
Fig. 2 is a side elevation view of the device of Fig. 1 with its longitudinal axis horizontal and with the clamp partly open.
Figure 3:
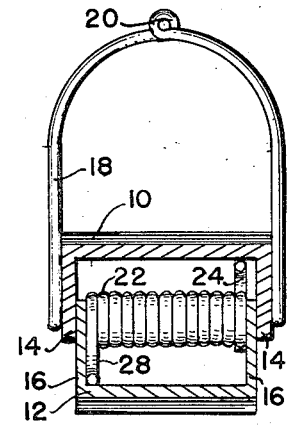
Fig. 3 is a cross-sectional view taken substantially along the line 3—3 in Fig. 5.
Figures 4, 5:
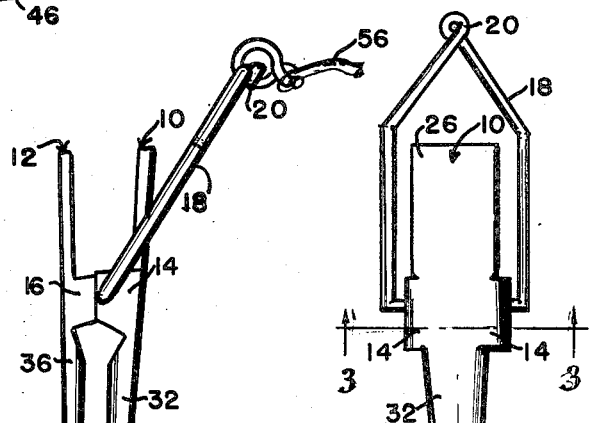
Fig. 4 is a side elevation view of the other side from Fig. 2 with longitudinal axis vertical and with the device closed on a live worm.
Fig. 5 is a front elevation view of the device in its vertical position as in Fig. 4.

In preparing the invention for operation the usual fish line 56 from pole or reel is tied or otherwise secured in the eyelet 20 so that the device itself extends from the end of the line in the same manner as most plugs. Using the thumb 58 and forefinger 60 on a respective end 26, 30 and pinching them together about hinge line of connector 18, the hook shafts 44, 46 are temporarily separated as seen in Fig. 2. In this position with the other hand a worm 62, or other bait, is positioned between the flat insides of hook 40, 42 and the fingers 58, 60 slowly released until the worm 62 is firmly clamped in place between insides 52, 54 in the manner of Figs. 4 and 5. As long as spring 22 is not too strong the worm 62 is not damaged and will struggle in normal fashion. Accordingly, a fish will strike this live, undamaged bait when otherwise it would be suspicious.

Since some people are repulsed by the gory act of baiting a hook in normal fashion of sticking the live bait, the present invention will attract many such who like to fish but heretofore would not fish simply because of their dislike for the baiting of live bait.

Although I have elected to describe and illustrate the above preferred form of my invention, it is not to be inferred that this limits me in any way as to the purview of my invention since various alterations, substitutions, modifications, eliminations, and variations of the preferred embodiment may be made within the scope of the appended claims.

I claim:

1. In a live bait device of the class described, a pair of elongated clamping members having clamping ends mounted in opposition, pivot means transversely between said clamping members, finger means for pivoting said members about said pivot, a coil spring wound with the ends thereof bearing against the members in such a manner as to maintain them with the clamping ends normally clamped together, each of said clamping ends of said members being formed as a sleeve portion, a pair of fish hooks each having a shaft and a barb with the shaft thereof being inserted in and fixed to the sleeve, said hook shafts extending from said sleeves in substantially coextensive relation and the bottom inside portion of said hooks being in substantial parallel contacting engagement whereby the inside faces of the bottom coextensive portions of said hooks are normally forced into abutting engagement through the action of said coil spring but are readily separable by said finger means, so that bait may be clamped between the hooks adjacent the barbs, and an attaching member for securing a fish line thereto.

2. In a live bait fishing device of the class described, a pair of elongated clamp members mounted in opposition, pivot means transversely connecting said clamp members, finger grip portions for pivoting said members about said pivot, a spring means interposed between said members so as to resiliently force one pair of the ends thereof in abutment under pressure and thereby forcing the finger grip portions thereof to be normally resiliently held spaced apart, a pair of fish hooks each having a substantially straight shaft bending into a barbed end, the hooks being mounted on said clamp members at the abutting ends thereof with the shaft of each hook rigidly attached to a respective clamp member, the shafts and barbed ends of said hooks being substantially in parallel alignment and with the ends thereof extending in the same direction placing the inner surfaces of said hooks adjacent the bend and barb in engagement thereby presenting a clamping portion for bait between said one pair of ends and between the ends of the hooks.

3. The device as set forth and claimed in claim 2 wherein said pivot means extends upwardly and outwardly from opposite sides of said clamp members and forms a loop member at a point outside said clamp members to which a fish line may be attached.

References Cited in the file of this patent

UNITED STATES PATENTS

| | | |
|---|---|---|
| 600,241 | Walker | Mar. 8, 1898 |
| 699,304 | Gebhardt | May 6, 1902 |
| 831,552 | Hallstrom | Sept. 25, 1906 |
| 1,324,109 | Dutes | Dec. 9, 1919 |
| 2,009,540 | Applegate | July 30, 1935 |
| 2,643,479 | Stevenson | June 30, 1953 |
| 2,659,996 | Hegler | Nov. 24, 1953 |